United States Patent [19]

Schulz et al.

[11] Patent Number: 4,961,705
[45] Date of Patent: Oct. 9, 1990

[54] FLUIDIZED BED REACTOR HAVING A HOUSING CASE FROM STEEL

[75] Inventors: Peter Schulz; Knut Vaupel, both of Essen, Fed. Rep. of Germany

[73] Assignee: Bergwerksverband GmbH, Essen, Fed. Rep. of Germany

[21] Appl. No.: 478,723

[22] Filed: Feb. 9, 1990

Related U.S. Application Data

[63] Continuation of Ser. No. 363,881, filed as PCT EP87/00638 on Oct. 28, 1987, published as WO88/04018 on Jun. 2, 1988, abandoned.

[30] Foreign Application Priority Data

Nov. 22, 1986 [DE] Fed. Rep. of Germany ....... 3639966

[51] Int. Cl.$^5$ ............................................. F27B 15/00
[52] U.S. Cl. .................................... 432/58; 122/4 D; 110/245
[58] Field of Search .................... 122/4 D, 209 R, 214; 110/245, 244; 432/15, 58

[56] References Cited

U.S. PATENT DOCUMENTS

| 4,462,341 | 7/1984 | Strohmeyer, Jr. ................. 122/4 D |
| 4,473,033 | 9/1984 | Strohmeyer et al. ............... 110/245 |
| 4,476,816 | 10/1984 | Cannon et al. ..................... 110/245 |
| 4,557,202 | 12/1985 | Warner .............................. 122/4 D |

Primary Examiner—Henry C. Yuen
Attorney, Agent, or Firm—Herbert Dubno

[57] ABSTRACT

A fluidized-bed reactor composed of modular steel castings is assembled from a support frame, a sliding frame and reactor housing segments on the frames so as to be able to withstand the temperatures and temperature gradients to which the reactor may be subject.

9 Claims, 7 Drawing Sheets

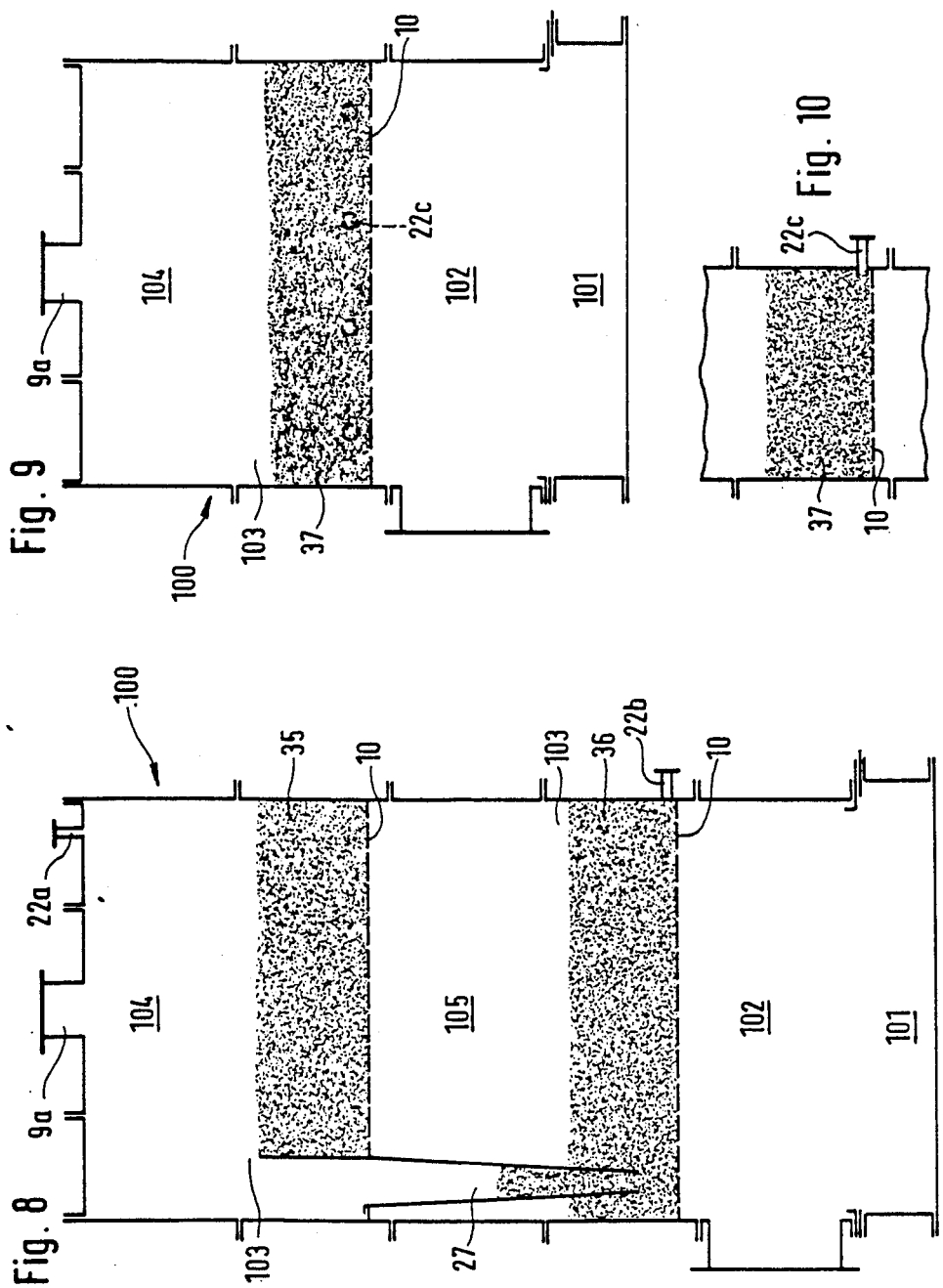

FLUIDIZED BED REACTOR HAVING A HOUSING CASE FROM STEEL

CROSS REFERENCE TO RELATED APPLICATIONS

This application is a continuation of Ser. No. 07/363,881, filed as PCT EP87/00638 on Oct. 28, 1987, published as WO88/04018 on Jun. 2, 1988, now abandoned.

FIELD OF THE INVENTION

The invention relates to a fluidized bed reactor having a housing cast from special steel, consisting of several superimposed square-shaped segments, and provided with an outer insulation.

BACKGROUND OF THE INVENTION

In comparison to the brick-lined fluidized bed reactors heretofore widely used, fluidized bed reactors having housings cast from speical steel have a higher heat-exchange stability, as well as shorter start-up and readying times.

Damaging temperature drops below the dewpoint cannot occur during operation.

However, in the case of fluidized bed reactors having housings cast from special steel, as mentioned in the introduction, the heat expansion cannot be optimally controlled, although the reactors already have a modular construction.

OBJECT OF THE INVENTION

It is the object of the invention to provide a fluidized bed reactor, so that the heat-expansion control, the assembly and the maintenance are improved.

SUMMARY OF THE INVENTION

This object is achieved according to the invention in a fluidized bed reactor having a housing cast from special steel and consisting of several square-shaped superimposed segments, having an outer insulation.

According to the invention, the segments are each composed of several assembled partially differently designed individual modules, and a mounting frame is provided and comprises frame parts, a base plate and screening plates. Holding flanges of the individual modules are provided with grooves which receive the guiding and securing elements and a sealing element and have receiving spigots for positioning of the holding clamps. The sliding frames are provided with grooves which receive the guiding and securing elements and sealing elements and, on the sliding frame, securing elements for the sealing contact pressure bars are mounted. The support frame is provided with recesses receiving guiding and securing elements, and on the support frame, guiding and securing elements are mounted.

The individual modules are provided with receiving profiles within the crossbars engage. The individual modules can be provided with receiving profiles wherein a grate bar bottom is lodged. Furthermore the individual modules can be provided with flange connections.

According to the invention, the mounting frame can be filled with refractory concrete and the latter can be separated from the frame segments by fireproof felt.

The holding clamp can have a hook and two wedge surfaces.

Moreover several segments with grate bar bottoms and therebetween arranged additional segments can be provided and between each two segments containing one lower and one upper fluidized layer, an overflow channel is arranged; in one of the segments a material supply connection and in another segment a material discharge connection can be provided. In one of the segments a fluidized sand layer and material supply connections and in another segment a material discharge connection are provided. One of the segments can be conically shaped and a combustion chamber is located herein.

Due to the subdivision of the segments of such fluidized bed reactors into individual modules, the heat expansions can be better controlled, since they have been taken into consideration prior to the construction. The above-mentioned general advantages of housings cast in special steel, such as short start-up and readying times, favorable heat insulation, no drops below the dewpoint, short assembly times and facilitated maintenance become even more effective with construction in individual modules.

By making one frontal wall as a fixed support and the other frontal wall as a loose support, heat expansions due to the strain resulting from changes are absorbed without deformation, although through the special guiding and securing elements a good overall rigidity is insured, and due to the externally arranged sealing elements a good insulation of the reactor is provided.

In order to enhance the rigidity of the construction, it could be advisable to provide crossbeams.

Suitably, the corresponding individual modules are provided with receiving elements for receiving a grate bar bottom.

The openings provided for the introduction of the drying gases and for the discharge of the same are suitably provided with flanges, which can be integrally cast with the modules.

The frame foundation is suitably filled with refractory concrete, which again improves the overall stability.

The basic principle of the aforedescribed fluidized bed reactor is generally applicable for the most varied of purposes. However, it is particularly appropriate for the drying of sludge, for the drying of such materials which contain plastics or other combustible substances, whose combustible dry substance can be involved to meet the heat requirements of the drying process.

A further preferred application is the field of regeneration of carbonaceous adsorbents, particularly those used in water treatments. Thereby, it is often possible to recirculate the vapors and to use them for temperature regulation.

BRIEF DESCRIPTION OF THE DRAWINGS

The fluidized bed reactor according to the invention is further described with the aid of the accompanying drawing, in which:

FIG. 8 is a schematic representation of the apparatus used for regeneration;

FIG. 9 is a schematic representation (longitudinal section) of the apparatus used for sludge drying;

FIG. 10 is a schematic representation (cross section) of the apparatus as used for sludge drying.

SPECIFIC DESCRIPTION

Figures 1, 2:
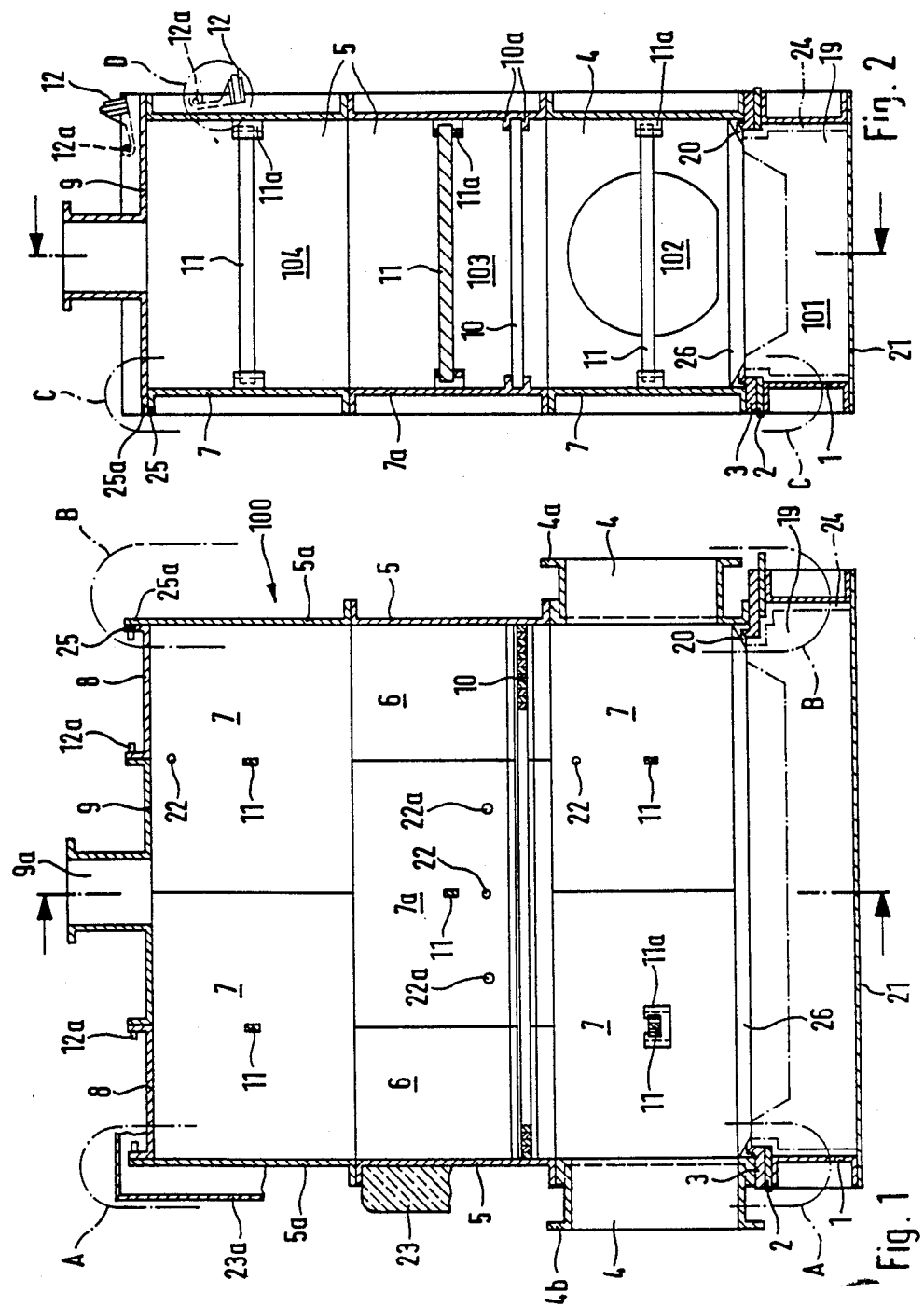
FIG. 1 is a cross section through the fluidized bed reactor according to the invention.
FIG. 2 is a longitudinal section through the apparatus of FIG. 1.

In FIGS. 1 and 2, the fluidized bed reactor 100 is shown to comprise base frame 1, to which support frame 2 has been assigned. The latter carries a sliding frame 3 made of several parts and upon which the furnace section consisting of individual modules of the reactor 100 is supported. From bottom to top, on each frontal side, a frontal side module 4 with flange connection 4a is provided, on which, on each side corresponding frontal side modules 5 and 5a come to rest. The longitudinal sides each, again considered from bottom to top, consist of two long longitudinal side modules 7, each having superimposed one long longitudinal side module 7a and two short longitudinal side modules 6. The upper end is formed again by two long longitudinal side modules 7. The furnace roof is composed of two outer roof modules 8 and a center module 9 with integraly cast exhaust gas flange 9a.

On the longitudinal side modules 6 and 7a, holding members 10a are fastened, wherein a grate bar bottom is supported. Furthermore, the modules 7 and 7a are provided with holding member 11a for crossbars 11 insuring increased rigidity of the construction.

The modules 4, 5, 5a, 6, 7, 7a, 8 and 9 have holding flanges 25 (FIGS. 3-5) or 25a, which are provided with guide spigots or pins 12a for the positioning of the swingable clamps 12 (see FIGS. 6 and 7) which straddle two adjacent flanges 25, whereby the modules are frictionally connected (clamped) together.

The individual modules can have bores through which probe connections 22 (FIG. 1) for instance for pressure- or temperature measurements or sample taking can be inserted, or connections for material supplies 22a, respectively for material discharge 22b can be inserted.

The base frame 1 is closed from below by a base plate 21. The space within the base frame 1 is filled with refractory concrete 19, whereby between the refractory concrete 19 and the base frame 1 is fireproof felt layer 24 is provided.

As shown in FIG. 1, on the outside of the modules a heat-insulating layer 23 is provided. This heat insulation 23 can be achieved, especially in the drying of sludge, by a surrounding steel-sheet hood 23a, in whose intermediate spaces preheated air is produced as an additional advantage, since it can be used in the process.

Screen plates 26 are inserted in the base frame 1, a slide felt 20 being fastened to these plates.

Figure 3:
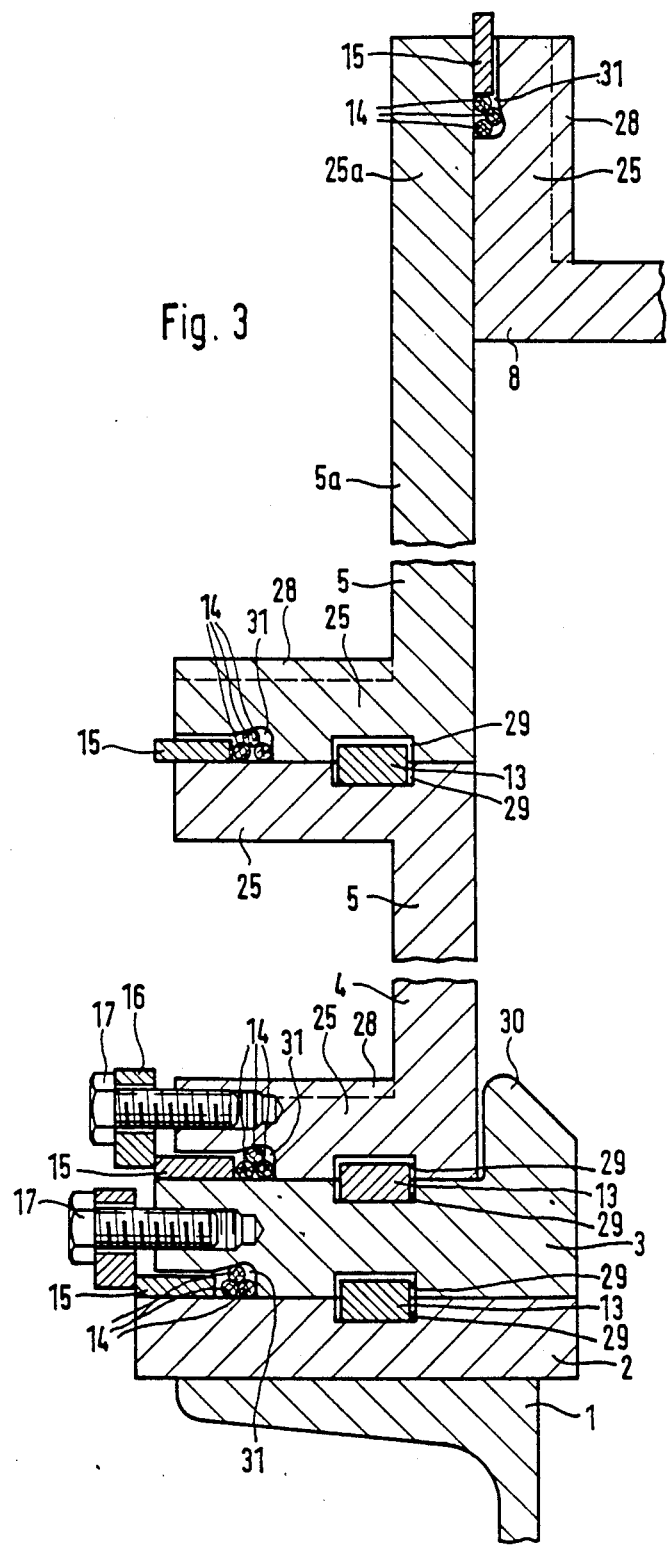
FIG. 3 is a separate representation of the fixed supports in section and to a larger scale.

In FIG. 3 (detail A of FIG. 1) the securing and sealing elements provided on the one frontal side (fixed support) are illustrated. Fitting keys 13 serve for the fastening of the modules 5 and 4 to each other, as well as to the sliding frame 3, and the sliding frame 3 to the support frame 2. Recesses 29 are provided in the holding flanges 25, enabling them to receive the fitting keys 13, and their dimensions are such as to allow heat expansion.

For the purpose of sealing against the outer atmosphere, in the sealing grooves 31 of the holding flanges 25, packing cords are imbedded, which are secured by sealing contact pressure bars 15. The sealing cords 14 and the sealing contact pressure bars 15 are also lodged in corresponding grooves 31 in the sliding frame 3.

The profile 30 of the sliding frame 3 serves all around as support surface for the fireproof felt 24, and also as support surface for a sliding felt 20, fastened to the screen plate 26.

To the sliding frame 3 a securing element 17, in the example a hexagonal head screw, which presses a lever 16 against the sealing contact pressure bar 15. In the area of the hexagonal head screw 17, the holding flange 25 has a reinforcement 28.

Figure 4:
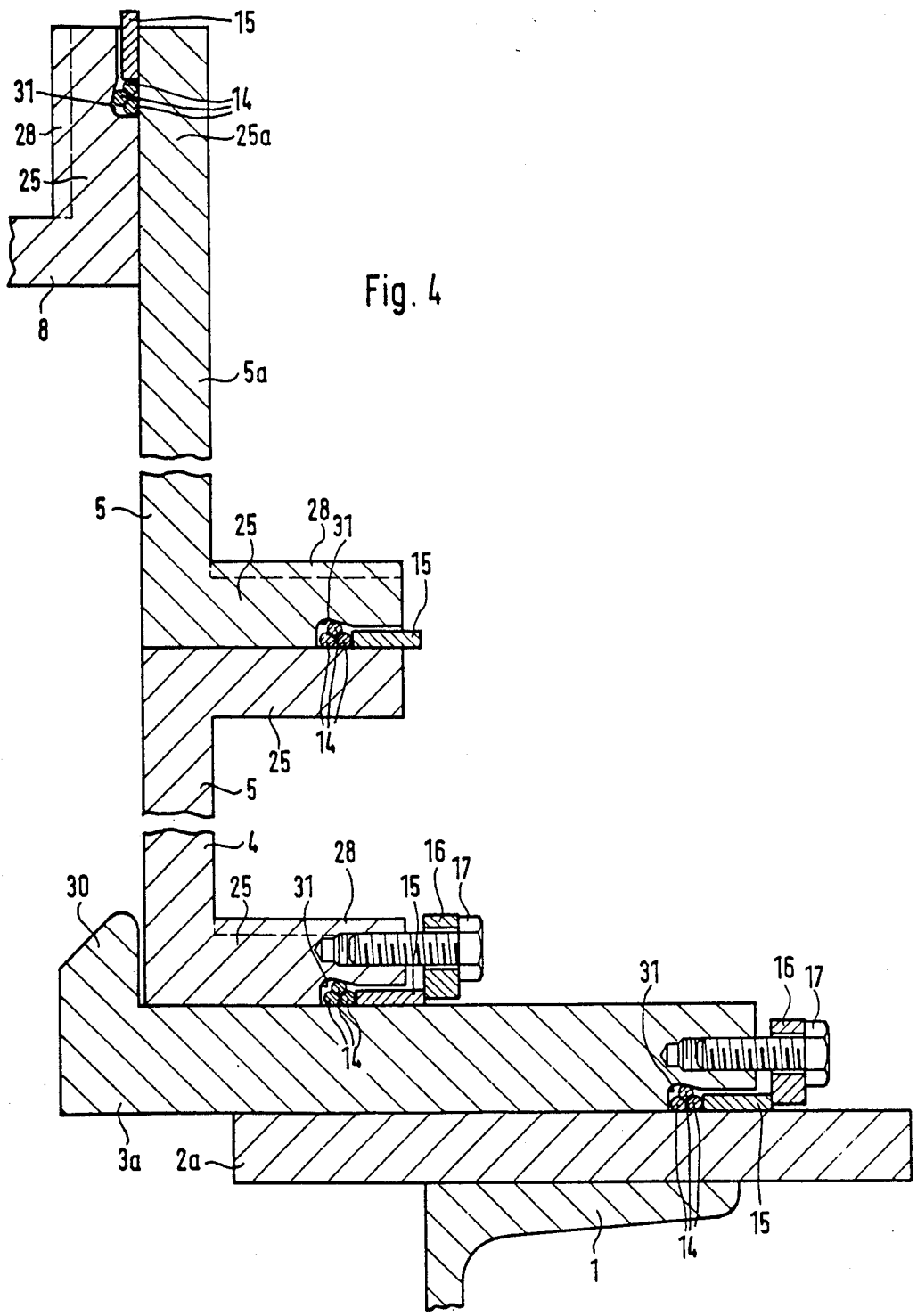
FIG. 4 is a separate representation of the loose supports in section and to the larger scale.

In FIG. 4, detail B of the system sealing the modules 4, 5 and 5a with respect to each other, as well with respect to the sliding frame 3a, is illustrated as the loose support of the reactor 100. The sliding frame 3 and the support frame 2 are designed to be wider on the side of the loose support, than on the fixed-support side, so that an umimpaired heat expansion of the reactor is insured.

Figure 5:
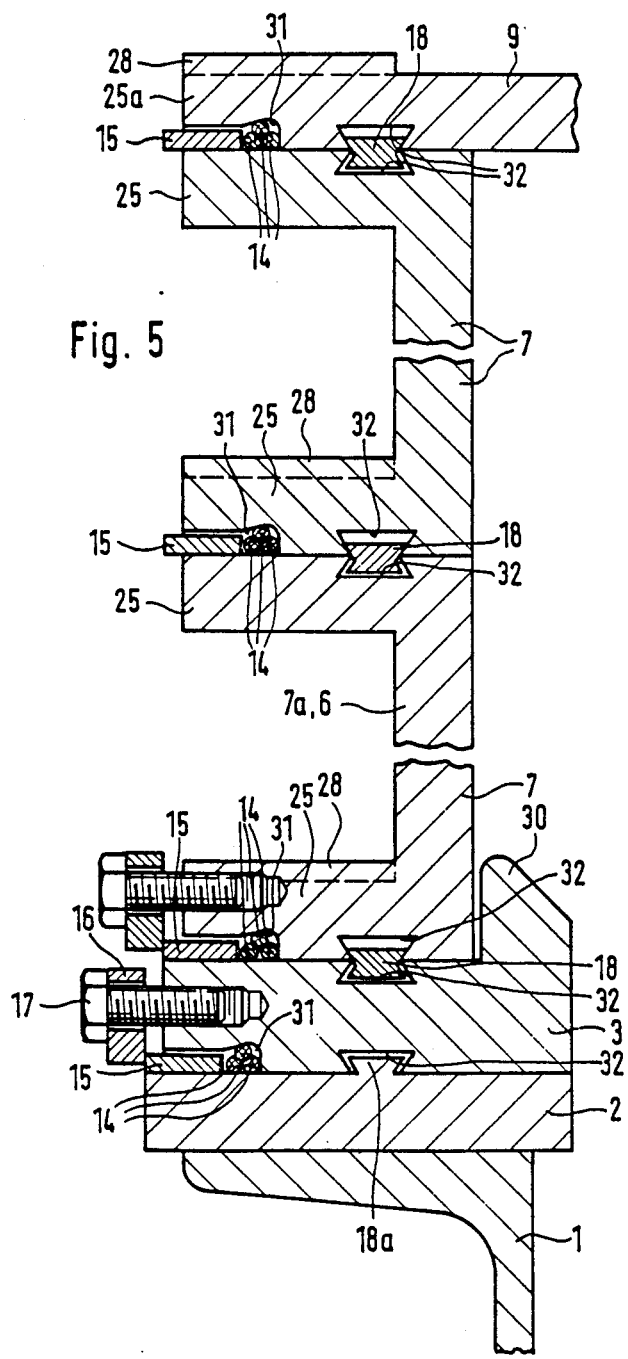
FIG. 5 is a detail section of the longitudinal guiding system.

In FIG. 5, the sealing and securing elements for the modules 6, 7, 7a and 9 on the longitudinal sides of the reactor 100 are illustrated according to detail C of FIG. 2. The sealing elements are the same as the ones already described in FIGS. 3 and 4 for the frontal side modules. The fastening of the modules to each other, as well as to the frame 3 takes place via dovetail-shaped guiding and securing keys 18, which are inserted in the recesses 32 of the modules 6, 7, 7a and 9.

The connections between the sliding frame 3 and the support frame 2 takes place via a guiding and securing bar 18a mounted on the support frame 2, which is assigned to the recess 32 in the sliding frame 3.

Figure 6:
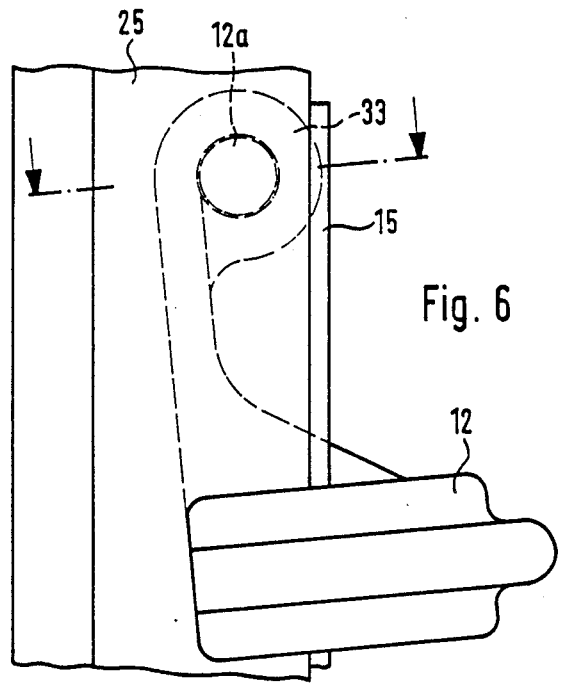
FIG. 6 is a detail elevation of the clamping system.
Figure 7:
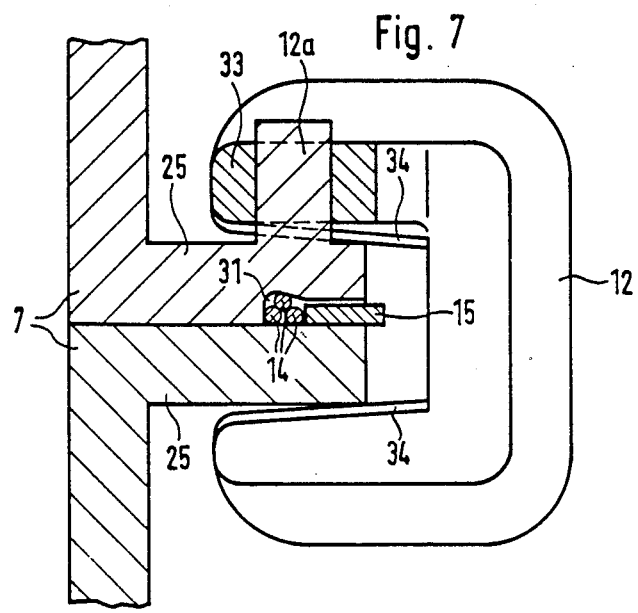
FIG. 7 is a detail section through the clamp of FIG. 6.

In FIGS. 6 and 7 (detail D of FIG. 2), the arrangement and functioning of the clamp 12 are illustrated in frontal view and in a partial section, the clamp energy with the eye 33 the guide pin 12a, which is fastened to the holding flange 25 of the modules. Through the clamp 12, the modules are vertically and horizontally fastened to each other. The clamp 12 surrounds with its inner flanks 34 two holding flanges 25 and frictionally connects them to each other.

FIG. 8 shows a fluidized bed reactor for the regeneration of adsorption agents, in a schematic representation. The supply of the adsorption agent, consisting preferably of activated carbon, takes place via the material-supply connection 22a in the reactor roof. The adsorption agent is fluidized due to the fluidization gas flowing from the bottom to the top through the grate bar bottoms 10 (upper fluidized layer 35 and lower fluidized layer 36) and through an overflow channel 27 reaches the lower fluidized layer 36. The regenerated adsorption agent exits the reactor 100 through the material discharge connection 22b, located at the end of the lower grate-bar bottom 10.

When the fluidized bed reactor 100 of the invention is used for the regeneration of for instance activated carbon from waster water purification, the process temperatures in the area of the upper fluidized layer 35 are preferably of about 400° C. and in the area of the lower fluidized layer 36 preferably of about 800° C.

Figure 11:
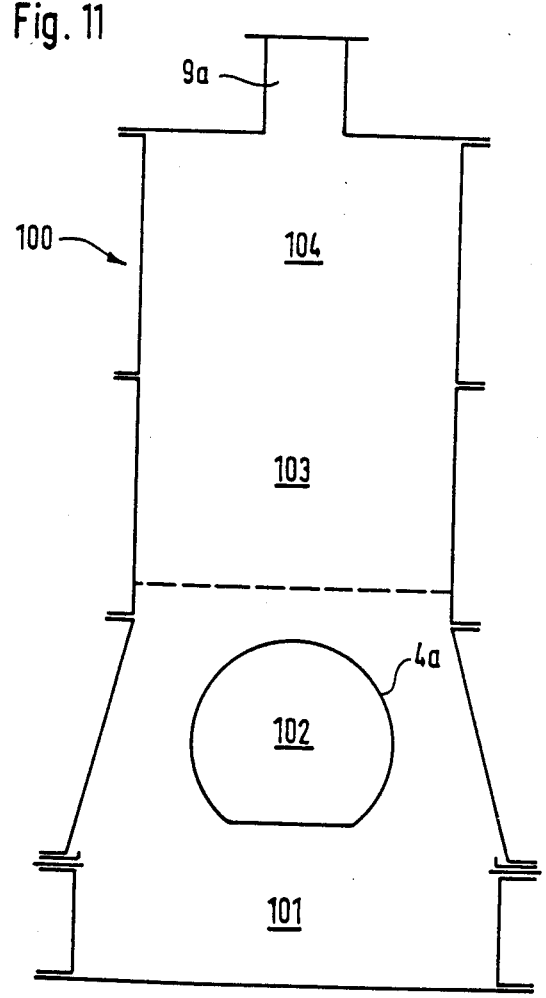
FIG. 11 is a schematic representation of a modified reactor according to FIGS. 9 and 10.

FIGS. 9 to 11 show in schematic representation a fluidized bed reactor 100 for the drying of sludge. The sludge is brought in through several supply connections 22c, preferably through delivery lances (not shown in the drawing) which are inserted into the supply connections 22c to, for instance, a fluidized sand layer operating in the reactor 100. In the fluidized bed reactor 100, the sludge is dried and discharged through the connection 9a together with the exhaust gas. In this process, the temperatures lie in the area underneath the inflow bottom 10 at preferably approximately 500° C., in the area of the fluidized sand layer 37 at preferably approximately 200° C. and in the area above the fluidized layer at preferably approximately 150° C.

FIG. 11 shows the reactor of FIGS. 9 and 10 in a longitudinal section with conically shaped lower segment 102. This configuration is advisable when, for instance for the production of the fluidization gas, a burner which is not shown in the drawing, has to be integrated in the segment 102.

We claim:

1. A fluidized-bed reactor composed of steel castings and comprising:
    an upwardly open mounting frame of rectangular plan configuration, closed below by a base plate and provided at an upper portion with a screen plate;
    a support frame of rectangular plan configuration on said mounting frame, said support frame having an upper surface formed along one side with a first longitudinally extending recess and along an adjoining side with a respective guiding and securing element;
    a sliding frame of rectangular plan configuration on said mounting frame, said sliding frame having a lower surface and an upper surface, said lower surface being formed with a second longitudinally extending recess registering with said first longitudinally extending recess and a third longitudinally extending recess receiving said guiding and securing element, said upper surface of said sliding frame being formed with fourth longitudinally extending recess;
    a plurality of reactor housing segments of rectangular plan configuration disposed one upon another and including a segment mounted on said sliding frame, said segments each being assembled from a plurality of wall modules of different dimensions having respective holding flanges with adjacent wall modules of each segment having adjoining pairs of flanges, one of the flanges of each adjoining pair being formed with a receiving pin, said segments being formed with confronting upper and lower surfaces having mutually registering fifth recesses and said segment mounted on said sliding frame having a lower surface formed with sixth recesses registering with said fourth recesses;
    respective guiding and securing elements received in said first and second recesses, in said fourth and sixth recesses and in said fifth recesses and bridging the registering recesses in which they are received;
    holding clamps on said pins clamping said adjoining flanges together, said surfaces of said segments being defined by supporting flanges, said holding flanges, said supporting flanges and said sliding frame being formed with peripherally open grooves;
    respective sealing elements received in said grooves for sealing along said adjoining flanges and said surfaces of said segments and said sliding frame;
    sealing contact pressure bars pressed against said seals; and
    securing members mounted on said sliding frame for retaining the pressure bars of said sliding frame in the respective grooves.

2. The fluidized-bed reactor defined in claim 1 wherein at least some of said modules are formed with receiving profiles in which cross bars extending across the reactor are engaged.

3. The fluidized-bed reactor defined in claim 1 wherein at least some of said modules are formed with receiving profiles in which a grate-bar bottom is lodged.

4. The fluidized-bed reactor defined in claim 1 wherein at least some of said modules are provided with flange connections affording access to said reactor.

5. The fluidized-bed reactor defined in claim 1 wherein said mounting frame is filled with refractory concrete separated from said frames by a fireproof belt.

6. The fluidized-bed reactor defined in claim 1 wherein said clamps each have a hook and two wedge surfaces.

7. The fluidized-bed reactor defined in claim 1 wherein at least some of said segments are provided with grate-bar bottoms and additional ones of said segments are provided between the segments with grate-bar bottoms between two of said segments containing a lower fluidized layer and an upper fluidized layer, an overflow channel being provided, said additional segment being formed with a material supply connection and in a segment with said grate-bar bottom a material discharge connection being provided.

8. The fluidized-bed reactor defined in claim 1 wherein a fluidized sand layer is maintained in a lower one of said segments and a material supply connection is provided in a segment above said lower segment, a material discharge connection being provided.

9. The fluidized-bed reactor defined in claim 8 wherein said sliding frame converges upwardly and has a combustion chamber located therein.

* * * * *